(12) United States Patent
Iwase et al.

(10) Patent No.: US 10,846,150 B2
(45) Date of Patent: Nov. 24, 2020

(54) INFORMATION PROCESSING METHOD AND TERMINAL APPARATUS

(71) Applicant: YAMAHA CORPORATION, Hamamatsu (JP)

(72) Inventors: Hiroyuki Iwase, Tokyo (JP); Yuki Seto, Tokyo (JP); Yumiko Ochi, Hong Kong (CN); Tetsuro Ishida, Tokyo (JP); Takahiro Iwata, Tokyo (JP); Shota Moriguchi, Tokyo (JP)

(73) Assignee: YAMAHA CORPORATION, Hamamatsu (JP)

( * ) Notice: Subject to any disclaimer, the term of this patent is extended or adjusted under 35 U.S.C. 154(b) by 136 days.

(21) Appl. No.: 16/168,044

(22) Filed: Oct. 23, 2018

(65) Prior Publication Data
US 2019/0056980 A1    Feb. 21, 2019

Related U.S. Application Data

(63) Continuation of application No. PCT/JP2017/015429, filed on Apr. 17, 2017.

(30) Foreign Application Priority Data

Apr. 25, 2016  (JP) ................................ 2016-086936

(51) Int. Cl.
*G06F 9/54* (2006.01)
(52) U.S. Cl.
CPC ..................... *G06F 9/542* (2013.01)
(58) Field of Classification Search
CPC ............ G06F 9/542; G06F 1/14; G06F 13/00; H04N 21/436; H04N 21/4884;
(Continued)

(56) References Cited

U.S. PATENT DOCUMENTS

| 6,785,539 B2 | 8/2004 | Hale et al. |
| 2005/0227614 A1 | 10/2005 | Hosking |

(Continued)

FOREIGN PATENT DOCUMENTS

| CA | 2129925 A1 | 2/1996 |
| EP | 3176783 A1 | 6/2017 |

(Continued)

OTHER PUBLICATIONS

Nakamura Kazuyuki, Machine Translation of JP 2007/236711, Sep. 20, 2007 (Year: 2007).*

(Continued)

*Primary Examiner* — Doon Y Chow
*Assistant Examiner* — Carina Yun
(74) *Attorney, Agent, or Firm* — Rossi, Kimms & McDowell LLP

(57) ABSTRACT

A terminal apparatus receives identification information for events transmitted sequentially in conjunction with occurrence of events; sequentially identifies estimated time points at which each event is estimated to occur; determines whether progress of the plurality of events has stopped depending on whether it receives identification information for each event at a corresponding estimated time point for each event; in each of a plurality of event groups obtained by temporally dividing events, when an estimated time point is reached for an earliest event among at least one event belonging to each event group, causes a playback device to play related information for the at least one event belonging to each event group, and when progress of events is determined to have stopped, defers update of related information, which the playback device caused to play, and then resumes update of played related information when identification information is received after the determination.

6 Claims, 9 Drawing Sheets

(58) Field of Classification Search
CPC ....... H04N 21/41415; H04N 21/42203; G11B 27/10; G11B 27/105; H04M 11/06
See application file for complete search history.

(56) References Cited

U.S. PATENT DOCUMENTS

| | | | |
|---|---|---|---|
| 2007/0047901 A1* | 3/2007 | Ando | G11B 20/10527 386/241 |
| 2007/0094014 A1* | 4/2007 | Pang | G10L 19/008 704/204 |
| 2017/0212720 A1 | 7/2017 | Moriguchi et al. | |

FOREIGN PATENT DOCUMENTS

| | | |
|---|---|---|
| JP | 2004229706 A | 8/2004 |
| JP | 2007236711 A | 9/2007 |
| JP | 2009213180 A | 9/2009 |
| WO | 03049315 A1 | 6/2003 |
| WO | 03061285 A2 | 7/2003 |
| WO | 2007008589 A2 | 1/2007 |
| WO | 2013179535 A1 | 12/2013 |
| WO | 2016017576 A1 | 2/2016 |

OTHER PUBLICATIONS

Office Action issued in Japanese Appln. No. 2016-086939 dated Jan. 7, 2020. English translation provided.
International Search Report issued in Intl. Appln. No. PCT/JP2017/015429 dated Jul. 4, 2017. English translation provided.
Written Opinion issued in Intl. Appln. No. PCT/JP2017/015429 dated Jul. 4, 2017.
Office Action issued in Japanese Appln. No. 2016-086936 dated Oct. 23, 2019. English translation provided.
Extended European Search Report issued in European Appln. No. 17789323.7 dated Nov. 21, 2019.
Office Action issued in Japanese Application No. 2016-086936 dated Apr. 7, 2020. English translation provided.

* cited by examiner

US 10,846,150 B2

INFORMATION PROCESSING METHOD AND TERMINAL APPARATUS

CROSS REFERENCE TO RELATED APPLICATIONS

This application is a Continuation Application of PCT Application No. PCT/JP2017/015429, filed Apr. 17, 2017, and is based on and claims priority from Japanese Patent Application No. 2016-086936, filed Apr. 25, 2016, the entire contents of each of which are incorporated herein by reference.

BACKGROUND OF THE INVENTION

Field of the Invention

The present invention relates to a technique for providing information to terminal apparatuses.

Description of Related Art

There exist in the art proposed conventional techniques for providing to a user information that relates to a variety of shows such as theatre plays or concerts, with the information being provided to a terminal apparatus of the user in conjunction with a progress of a show. For example, Japanese Patent Application Laid-Open Publication No. 2009-213180 (hereafter, Patent Document 1) discloses a configuration for sequentially transmitting, to a portable device of a user, time codes in conjunction with the progress of a show, and also causing commentary information, such as subtitles, to be displayed on the portable device at a time point derived from each time code.

The technique disclosed in Patent Document 1, however, has a drawback in that a portable device may fail to update information displayed thereon in a case where a time code is not properly received at the device.

SUMMARY OF THE INVENTION

Taking into consideration the above circumstances, an object of the present invention is to play, at appropriate timings, information related to events that occur chronologically.

In order to solve the above object, an information processing method according to one aspect of the present invention includes: receiving identification information for a plurality of events transmitted sequentially in conjunction with occurrence of the plurality of events; sequentially identifying estimated time points at each of which each event is estimated to occur; determining whether progress of the plurality of events has stopped depending on whether identification information for each event is received at around a corresponding estimated time point for each event; and, in each of a plurality of event groups obtained by temporally dividing the plurality of events, when an estimated time point is reached for an earliest event among at least one event belonging to each event group, causing a playback device to play related information for the at least one event belonging to each event group, and when the progress of the plurality of events is determined to have stopped, deferring update of the related information, which the playback device is being caused to play, and then resuming update of the played related information when the identification information is received after the determination.

A terminal apparatus according to another aspect of the present invention has at least one processor configured to execute stored instructions to: receive identification information for a plurality of events transmitted sequentially in conjunction with occurrence of the plurality of events; sequentially identify estimated time points at each of which each event is estimated to occur; determine whether progress of the plurality of events has stopped depending on whether identification information for each event is received at around a corresponding estimated time point for each event; and, for each of a plurality of event groups obtained by temporally dividing the plurality of events, when an estimated time point is reached for an earliest event among at least one event belonging to each event group, cause a playback device to play related information for the at least one event belonging to each event group, and when the progress of the plurality of events is determined to have stopped, defer update in the related information, which the playback device is being caused to play, and then resume the update in the played related information when the identification information is received after the determination.

A terminal apparatus according to still another aspect of the present invention has at least one processor configured to execute stored instructions to: receive identification information for a plurality of events transmitted sequentially in conjunction with occurrence of the plurality of events; and cause a playback device to play related information for each event that corresponds to the received identification information of each event.

DESCRIPTION OF THE EMBODIMENTS

First Embodiment

Figure 1:
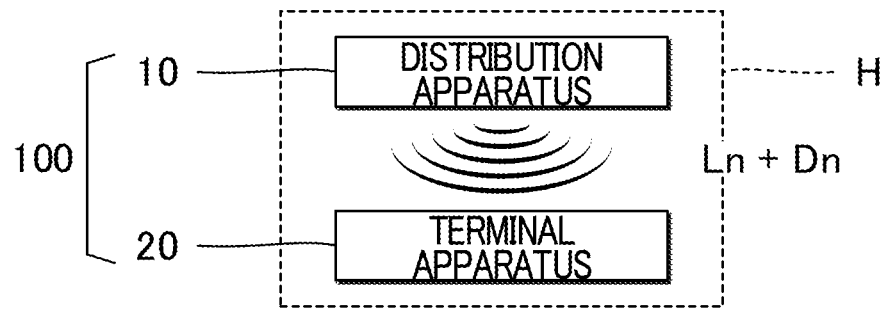
FIG. 1 is a block diagram of an information providing system according to a first embodiment of the present invention.

FIG. 1 is a block diagram showing an information providing system 100 according to a first embodiment of the present invention. The information providing system 100 of the first embodiment is a computer system for providing users with information related to various shows, such as theatre plays, concerts, movies, or the like, in conjunction with a progress of the show, and includes a distribution apparatus 10 and a terminal apparatus 20 as shown in FIG. 1. The distribution apparatus 10 is installed at a facility H, such as a theatre or hall, where various shows are performed. A user who visits the facility H carries the terminal apparatus 20. The terminal apparatus 20 is a portable information processing terminal, such as a portable telephone, a smartphone, etc. In reality, multiple terminal apparatuses 20 are present in the facility H, but for convenience of explanation the following description focuses on a single terminal apparatus 20.

In the first embodiment, a case is assumed where a show (e.g., character show) is performed in the facility H. In the show, multiple quotes prepared in advance are voiced chronologically in a predetermined order. A user views the show while carrying the terminal apparatus 20. The terminal apparatus 20 displays information that relates to each of multiple quotes voiced chronologically (hereafter, "related information"). The terminal apparatus 20 sequentially displays the related information in conjunction with the progress of the show. More specifically, for example, text representative of each quote (i.e., subtitles) are displayed at the terminal apparatus 20. With the above configuration, a user of the terminal apparatus 20 is able to visually understand the quotes of the show by checking, whenever necessary, related information sequentially displayed on the terminal apparatus 20 while viewing the show. Thus, the above configuration has an advantage, for example, in that a hearing-impaired person is able to understand the content of the show.

Figure 2:
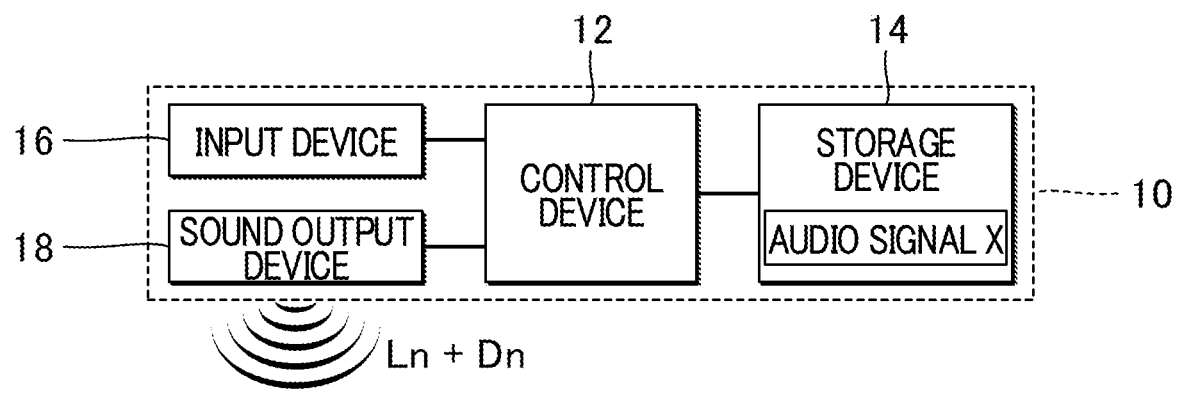
FIG. 2 is a block diagram of a distribution apparatus.

FIG. 2 is a block diagram of the distribution apparatus 10. As shown in FIG. 2, the distribution apparatus 10 of the first embodiment includes a control device 12, a storage device 14, an input device 16, and a sound output device 18. The control device 12 is, for example, processing circuitry, such as a CPU (Central Processing Unit) and integrally controls each element of the distribution apparatus 10. The storage device 14 consists of well-known storage media, such as a semiconductor storage medium and a magnetic storage medium, or a combination of various types of storage media. The storage device 14 has stored therein programs executed by the control device 12 and various data used by the control device 12. The storage device 14 of the first embodiment has stored therein an audio signal X. The audio signal X is a time signal representative of voices of multiple quotes spoken in the show.

The sound output device 18 is a speaker device installed at the facility H, for example, and plays sound represented by the audio signal X. For the sake of convenience, a D/A converter, which converts the audio signal X from digital to analog, and an amplifier, which amplifies the audio signal X, have been omitted from the drawings. The input device 16 is operation equipment for receiving instructions from an administrator who runs the show. For example, by operating the input device 16 as appropriate, the administrator is able to instruct the distribution apparatus 10 to reproduce or stop reproducing the audio signal X whenever necessary. The control device 12 supplies the audio signal X to the sound output device 18 according to instructions provided by the administrator via the input device 16. Consequently, voices of each of the multiple quotes are sequentially played from the sound output device 18. The audio signal X is reproduced in conjunction with performances of performers on a stage of the facility H. Thus, this is how the show is configured.

Figure 3:
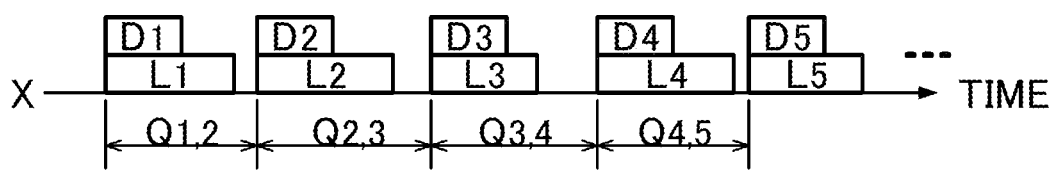
FIG. 3 is an explanatory diagram illustrating an audio signal.

FIG. 3 is an explanatory diagram illustrating audio components contained in the audio signal X. As shown in FIG. 3, audio components of multiple quotes $L_n$ ($L_1$, $L_2$, $L_3$, . . . ) are contained in different sections of the audio signal X (hereafter, "playback section") (n is a natural number). Accordingly, as a result of the sound output device 18 reproducing the audio signal X, the audio components of quotes $L_n$ are sequentially output as sounds. Additionally, there is contained in a playback section of one quote $L_n$ of the audio signal X an audio component representative of identification information $D_n$ of the quote $L_n$. The identification information $D_n$ ($D_1$, $D_2$, $D_3$, . . . ) is a sign that identifies a quote $L_n$. The audio component of the identification information $D_n$ is a modulated component generated by a modulation process, such as frequency modulation that modulates a carrier wave, such as a sine wave of a predetermined frequency, with the identification information $D_n$ or spread modulation of the identification information $D_n$ with use of a spreading code. The frequency band of the audio component of the identification information $D_n$ is set to fall within a range (e.g., 18 kHz or higher and 20 kHz or lower) that is higher than a frequency band of sound audible to a user in a normal environment.

The audio signal X, shown as an example above, is supplied to the sound output device 18 in FIG. 2. Consequently, the audio component of the quote $L_n$ and that of the identification information $D_n$ are output from the sound output device 18. Thus, the sound output device 18 of the first embodiment functions as audio equipment that outputs the audio component of the quote $L_n$ as sound and also functions as a transmitter that transmits the identification information $D_n$ of the quote $L_n$ to the surrounding area by means of sound communication that utilizes sound waves (i.e., vibration of air) as a transmission medium.

Figure 4:
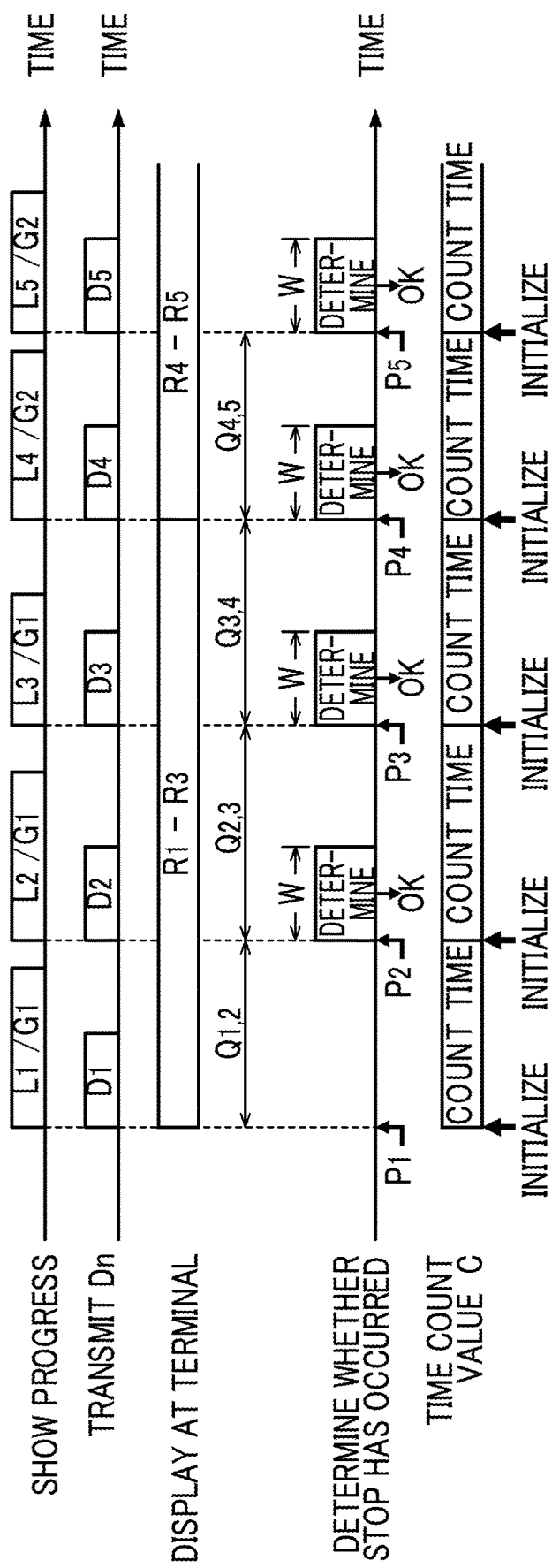
FIG. 4 is an explanatory diagram illustrating a relation between the progress of a show and an operation of a terminal apparatus.

FIG. 4 is an explanatory diagram illustrating a relation between the progress of a show and an operation of the terminal apparatus 20. As shown in FIG. 4, the distribution apparatus 10 sequentially transmits identification information $D_n$ of multiple quotes $L_n$ via sound communication, in conjunction with the playback of the quotes $L_n$ (i.e., the progress of the show). For example, in conjunction with the playback of an n-th quote $L_n$, the identification information $D_n$ of this quote $L_n$ is transmitted from the distribution apparatus 10. In other words, identification information $D_n$ are sequentially transmitted in synchronization with the sequential playback of quotes $L_n$. FIG. 3 and FIG. 4 show a case of starting to transmit identification information $D_n$ of a quote $L_n$ at the same time as initiation of a playback section for the quote $L_n$. The temporal relation between the playback section of a quote $L_n$ and a period during which corresponding identification information $D_n$ is transmitted may be changed as appropriate. If a configuration is adopted whereby identification information $D_n$ is transmitted multiple times (repeatedly transmitted) during the playback section of a corresponding quote $L_n$, a possibility of the terminal apparatus 20 failing to receive the identification information $D_n$ is reduced.

Figures 5, 6:
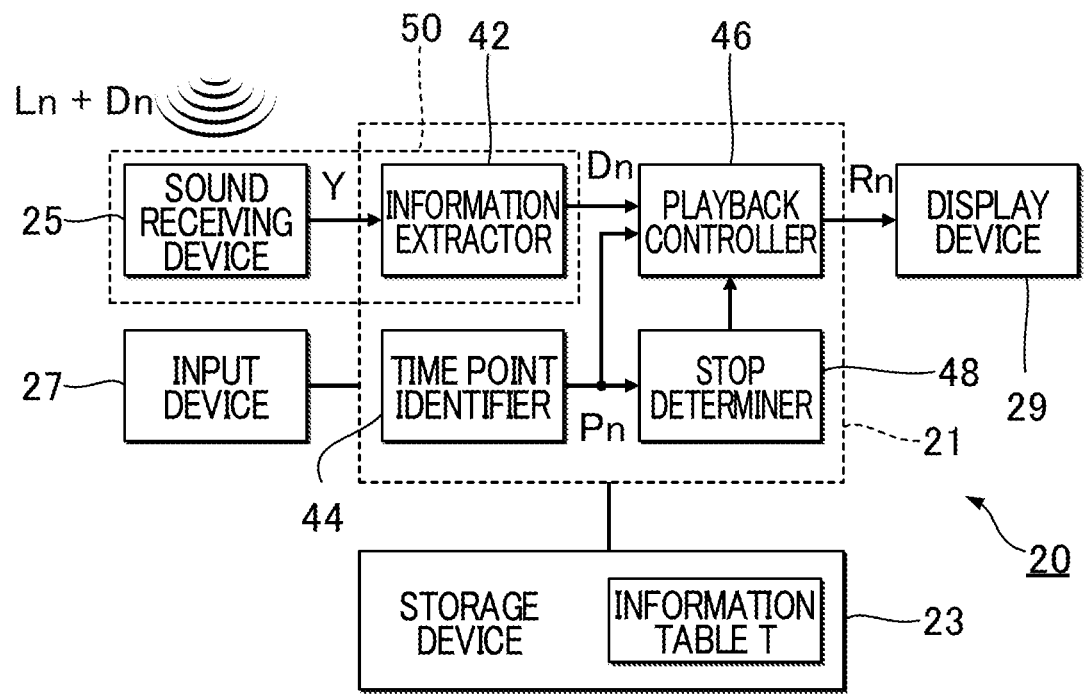
FIG. 5 is a block diagram of a terminal apparatus.
FIG. 6 is a schematic diagram of an information table.

FIG. 5 is a block diagram of the terminal apparatus 20. As shown in FIG. 5, the terminal apparatus 20 has a control device 21, a storage device 23, a sound receiving device 25, an input device 27, and a display device 29. The control device 21 is processing circuitry, such as a CPU, and integrally controls each element of the terminal apparatus 20. The storage device 23 is formed of a well-known storage media, such as a magnetic recording medium or a semiconductor recording medium, or a combination of various types of storage media, and has stored therein programs executed by the control device 21 and various data used by the control device 21. The storage device 23 of the first embodiment has stored therein an information table T illustrated in FIG. 6. For example, an information table T received from a management server (not shown) is stored in the storage device 23, where the information table T is received by the terminal apparatus 20 via a communication network, such as a mobile communication network or the Internet.

As shown in FIG. 6, the information table T is a data table in which, for each of multiple quotes $L_n$ that may be voiced in a show, a pair of identification information $D_n$ ($D_1$, $D_2$, $D_3$, . . . ) and related information $R_n$ ($R_1$, $R_2$, $R_3$, . . . ) is registered. Pairs of the identification information $D_n$ and the related information $R_n$ are listed in the spoken order of corresponding quotes $L_n$ in the show. Related information $R_n$ for each quote $L_n$ in the first embodiment is text data representative of a text of each quote $L_n$. As described above, the identification information $D_n$ is a sign that identifies each quote $L_n$ but may also be thought of as a sign that identifies related information $R_n$.

As shown in FIG. 6, there are registered in the information table T of the first embodiment time differences $q_{n,n+1}$ ($Q_{1,2}$, $Q_{2,3}$, $Q_{3,4}$, . . . ). Each time difference $Q_{n,n+1}$ is registered for a corresponding pair of two consecutive quotes ($L_n$ and $L_{n+1}$). The time difference Q is a time between two consecutive quotes $L_n$ within the audio signal X. Specifically, as shown in FIG. 3, a time difference $Q_{n,n+}$ is an interval between the start point of the playback section of the n-th quote $L_n$ and the start point of the playback section of the immediately subsequent quote $L_{n+1}$. Therefore, if the show progresses as scheduled, within the sound played by the sound output device 18 of the distribution apparatus 10, the voice of a quote $L_{n+1}$ will start at a time point when a time difference $Q_{n,n+1}$ has elapsed from the time point at which the voice of a quote $L_n$ starts. For example, the voice of the second quote $L_2$ will start at a time point at which a time difference $Q_{1,2}$ has elapsed from the start of the voice of the first quote $L_1$, and the voice of the third quote $L_3$ will start at a time point at which a time difference $Q_{2,3}$ has elapsed from the start of the voice of the quote $L_2$.

As shown in FIG. 6, multiple quotes $L_n$ are divided into multiple sets on a time axis (hereafter, "quote group") $G_m$ (m is a natural number). Each quote group $G_m$ ($G_1$, $G_2$, . . . ) is a set of consecutive multiple quotes $L_n$ on a time axis. FIG. 6 shows a case in which the first to third quotes $L_n$ ($L_1$, $L_2$, and $L_3$), which makes three quotes, are grouped to form a first quote group $G_1$, and the fourth and fifth quotes $L_n$ ($L_4$ and $L_5$), which makes two quotes, are grouped to form a second quote group $G_2$. The information table T defines sections between quote groups $G_m$ (boundaries between consecutive quote groups $G_m$). For example, data indicative of a boundary between consecutive quote groups ($G_m$ or $G_{m+1}$), or data (e.g., flag) indicative of an earliest or a last quote $L_n$ of each quote group $G_m$ is included in the information table T. The total number of quotes $L_n$ belonging to each quote group $G_m$ varies for each quote group $G_m$. A quote group $G_m$ may be comprised of a single quote $L_n$. If the identification information $D_n$ the related information $R_n$, the time difference $Q_{n,n+1}$, and the quote group $G_m$ can be made to correspond with one another, the information table T may be configured to have multiple tables.

The sound receiving device 25 (microphone) in FIG. 5 is audio equipment that receives sound and generates an audio signal Y. Specifically, the sound receiving device 25 generates an audio signal Y representative of a sound played by the sound output device 18 of the distribution apparatus 10 (i.e., mixed sound of an audio component of a quote $L_n$ and that of corresponding identification information $D_n$). For the sake of convenience, an A/D converter, which converts the audio signal Y generated by the sound receiving device 25 from analog to digital format, has been omitted from the drawings.

The input device 27 is input equipment operable by a user for providing various instructions to the terminal apparatus 20. For example, a set of multiple operators operable by a user or a touch panel for detecting touch operations made by a user is suitable for use as the input device 27. The display device 29 (e.g., liquid display panel) displays related information $R_n$ thereon under control of the control device 21. Either one or both of the sound receiving device 25 and the display device 29 may be configured as a unit separate from the terminal apparatus 20, while being connected to the terminal apparatus 20.

As shown in FIG. 5, the control device 21 executes a program stored in the storage device 23, whereby there are realized a plurality of functions (an information extractor 42, a time point identifier 44, a playback controller 46, and a stop determiner 48) for providing related information R to users. A configuration in which the functions of the control device 21 illustrated above are dividedly allocated to a plurality of devices. Also applicable is a configuration in which part or all of the functions of the control device 21 is realized by dedicated electronic circuitry.

The information extractor 42 extracts identification information $D_n$ of each quote $L_n$ from the audio signal Y generated by the sound receiving device 25. Specifically, the information extractor 42 selects audio components of a frequency range containing the identification information $D_n$ from the audio signal Y by means of a band path filter, for example, and executes on the audio components a demodulation process corresponding to a modulation process used in generating the audio signal X, thereby to extract the identification information $D_n$. Specifically, each time the sound output device 18 outputs the sound of a quote $L_n$, the identification information $D_n$ of the quote $L_n$ is extracted, whereby the identification information $D_n$ is extracted sequentially. As will be understood from the foregoing description, the sound receiving device 25 of the first embodiment is used not only for voice communication between terminal apparatuses 20 or for recording sounds when capturing moving images, but also for receiving identification information $D_n$ via sound communication. In other words, the sound receiving device 25 and the information extractor 42 function as an information receiver 50 that can receive, in conjunction with the playback of multiple quotes $L_n$, identification information $D_n$ of quotes $L_n$ sequentially transmitted from the distribution apparatus 10.

As shown in FIG. 4, the time point identifier 44 sequentially identifies time points at each of which a quote $L_n$ is estimated to be voiced (hereafter, "estimated time point") $P_n$. Specifically, the time point identifier 44 identifies a time point when a time difference $Q_{n,n+1}$ specified in the information table T has elapsed from a certain estimated time point $P_n$ as an estimated time point $P_{n+1}$ at which the (n+1)st quote $L_{n+1}$ is to be voiced. Further, as shown in FIG. 4, an estimated time point $P_3$ of the third quote $L_3$ is a time point at which a time difference $Q_{2,3}$ has elapsed from an estimated time point $P_2$ of an immediately previous quote $L_2$. The time point identifier 44 of the first embodiment causes a time count value C (e.g., a count value by an internal timer) to increase over time from an estimated time point $P_n$, and identifies as an estimated time point $P_{n+1}$ of a quote $L_{n+1}$ a time point at which the time count value C reaches a time difference $Q_{n,n+1}$ specified by the information table T. For the first quote $L_1$, the time point identifier 44 identifies as an estimated time point $P_1$ a time point at which the information receiver 50 receives the first identification information $D_1$ from the distribution apparatus 10. As shown in FIG. 4, each time each estimated time point $P_n$ is reached, the time count value C is initialized to zero.

The playback controller 46 of FIG. 5 controls display of related information $R_n$ performed by the display device 29. Specifically, the playback controller 46, for each of multiple quote groups $G_m$, causes the display device 29 to display related information $R_n$ of multiple quotes $L_n$ belonging to each quote group $G_m$. The display is triggered by arrival of an estimated time point $P_n$ corresponding to the earliest quote $L_n$ of the quote group $G_m$. For example, as shown in FIG. 4, when an estimated time point $P_1$ of the earliest quote $L_1$ within a quote group $G_1$ is reached, the playback controller 46 causes the display device 29 to display related information $R_n$ of multiple quotes $L_n$ (related information $R_1$, $R_2$, and $R_3$) belonging to the quote group $G_1$. When an estimated time point $P_4$ of the earliest quote $L_4$ within a quote group $G_2$ is reached, the playback controller 46 causes the display device 29 to display related information $R_n$ of multiple quotes $L_n$ (related information $R_4$ and $R_5$) belonging to the quote group $G_2$. Thus, for each estimated time point $P_n$ the time point identifier 44 identifies for the earliest quote $L_n$ of a quote group $G_m$, related information $R_n$ displayed on the display device 29 is updated. As will be understood from the foregoing description, a quote group $G_m$ is a set of multiple quotes $L_n$ displayed collectively on the terminal apparatus 20.

In actuality, however, an unexpected event that is not presumed (hereafter, "unexpected situation") could occur between consecutive quotes $L_n$ in a show. An unexpected situation is a circumstance that lasts for a variable period, a typical example of which is improvised acting by a performer (ad-lib). In a case where an unexpected situation arises, the administrator operates the input device 16 of the distribution apparatus 10 to instruct the control device 12 to stop reproduction of an audio signal X, and to resume the reproduction of the audio signal X when the unexpected situation ends. The control device 12 of the distribution apparatus 10 stops or resumes the reproduction of the audio signal X depending on an instruction from the administrator. As will be understood from the foregoing description, when an unexpected situation arises, the progress of the playback of the quote $L_n$ (hereafter, "quote progress") stops. Accordingly, it is essential to detect an occurrence of an unexpected situation (stop in quote progress) and to identify an estimated time point $P_n$ of each of subsequent quotes $L_n$, in order to realize timely display of related information $R_n$ with progression of the quote.

Taking into consideration the circumstances discussed above, the stop determiner 48 of FIG. 5 determines whether the quote progress has stopped (i.e., whether an unexpected situation has arisen). As described above with reference to FIG. 3, the distribution apparatus 10 transmits identification information $D_n$ of each quote $L_n$ together with the playback of the quote $L_n$. Therefore, it is expected that in a situation where the show is progressing as scheduled (i.e., an unexpected situation has not arisen), the information receiver 50 should receive identification information $D_n$ of a quote $L_n$ at around an estimated time point $P_n$ of the quote $L_n$. On the other hand, in a case where the quote progress has stopped, the information receiver 50 will not be able to receive identification information $D_n$ of a quote $L_n$ at around an estimated time point $P_n$ of the quote $L_n$.

Taking into account the foregoing, the stop determiner 48 of the first embodiment determines whether the quote progress has stopped depending on whether the information receiver 50 has received identification information $D_n$ of a quote $L_n$ at around an estimated time point $P_n$ that the time point identifier 44 identifies for each quote $L_n$. Specifically, the stop determiner 48, as shown in FIG. 4, determines that the quote progress has not stopped if the information receiver 50 receives identification information $D_n$ of each quote $L_n$ during a predetermined period W (hereafter, "determination period") including an estimated time point $P_n$ of each quote $L_n$, and determines that the quote progress has stopped if the information receiver 50 does not receive the identification information $D_n$ within the determination period W.

In a case where the stop determiner 48 determines that the quote progress has not stopped, an operation of the time point identifier 44 sequentially identifying estimated time points $P_n$ and an operation of the playback controller 46 sequentially updating the display of related information $R_n$ continue, as described above. On the other hand, in a case where the stop determiner 48 determines that the quote progress has stopped, identification of an estimated time point $P_n$ (increase in the time count value C) by the time point identifier 44 and update in display of related information $R_n$ by the playback controller 46 are deferred. Specific operational examples of the case of quote progress stoppage are described in the following.

Figure 7:
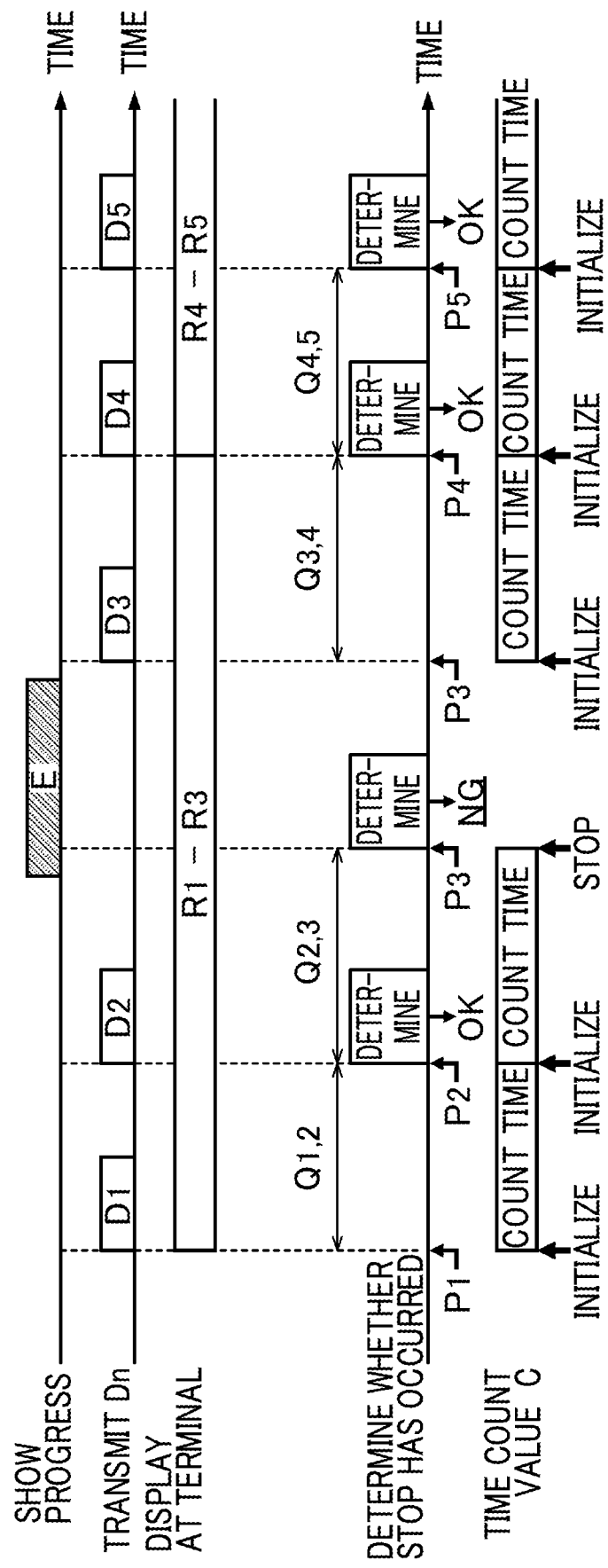
FIG. 7 is an explanatory diagram illustrating an operation of the terminal apparatus when an unexpected situation arises.

FIG. 7 is an explanatory diagram illustrating an operation of a case where, as a result of an unexpected situation E arising between two consecutive quotes L ($L_n$ and $L_{n+1}$) within a single quote group $G_m$, the quote progress stops immediately before the quote $L_{n+1}$. Specifically, FIG. 7 shows a case where an unexpected situation E arises between a quote $L_2$ and a quote $L_3$ within a quote group $G_1$, and as a result the quote $L_3$ is delayed.

The stop determiner 48 determines whether the information receiver 50 receives the identification information $D_3$ of the quote $L_3$ within a determination period W starting from an estimated time point $P_3$ the time point identifier 44 has identified. As shown in FIG. 7, since an unexpected situation E has arisen at the estimated time point $P_3$, the identification information $D_3$ is not transmitted or received during the determination period W. Therefore, the stop determiner 48 determines that the quote progress has stopped ("NG" in FIG. 7). In this case, counting of the time count value C (identification of an estimated time point $P_4$) by the time point identifier 44 and the display update by the playback controller 46 are deferred.

When the unexpected situation E ends, the distribution apparatus 10 resumes reproduction of the audio signal X (identification information $D_n$ transmission). As shown in FIG. 7, if the information receiver 50 receives the identification information $D_3$ for the first time after the quote progress has resumed, a time point at which the identification information $D_3$ is received is treated as a new estimated time point $P_3$, and the time point identifier 44 resumes counting the time count value C. After the estimated time point $P_4$ is reached, which is a time point when a time difference $Q_{3,4}$ has elapsed from the updated estimated time point $P_3$, the time point identifier 44 continues counting time after initializing the time count value C, and the playback controller 46 causes the display device 29 to display related information $R_n$ of the quote $L_n$ (related information $R_4$ and $R_5$) belonging to the quote group $G_2$. In other words, the display of related information $R_n$ of the quote $L_n$ belonging to the quote group $G_1$ (related information $R_1$, $R_2$ and $R_3$) is updated to the display of related information $R_n$ of the quote $L_n$ (related information $R_4$ and $R_5$) belonging to the quote group $G_2$. This update is triggered by the arrival of the estimated time point $P_4$. The stop determiner 48 determines whether the quote progress has stopped depending on whether the information receiver 50 receives the identification information $D_4$ of the quote $L_4$ within a determination period W starting from the estimated time point $P_4$. When the stop determiner 48 determines that the quote progress has stopped, estimated time point $P_n$ identification and related information $R_n$ display update are deferred, as described above.

In the above description, the arrival of the estimated time point $P_4$ after the quote progress resumes triggers display of related information $R_n$ of the quote $L_n$ (related information $R_4$ and $R_5$) of the quote group $G_2$. Differently, in a state in which the display of related information $R_n$ is updated for the first time after the quote progress resumes, both the arrival of the estimated time point $P_4$ and the reception of the identification information $D_4$ may serve as conditions for displaying the related information $R_n$ for the quote group $G_2$.

Figure 8:
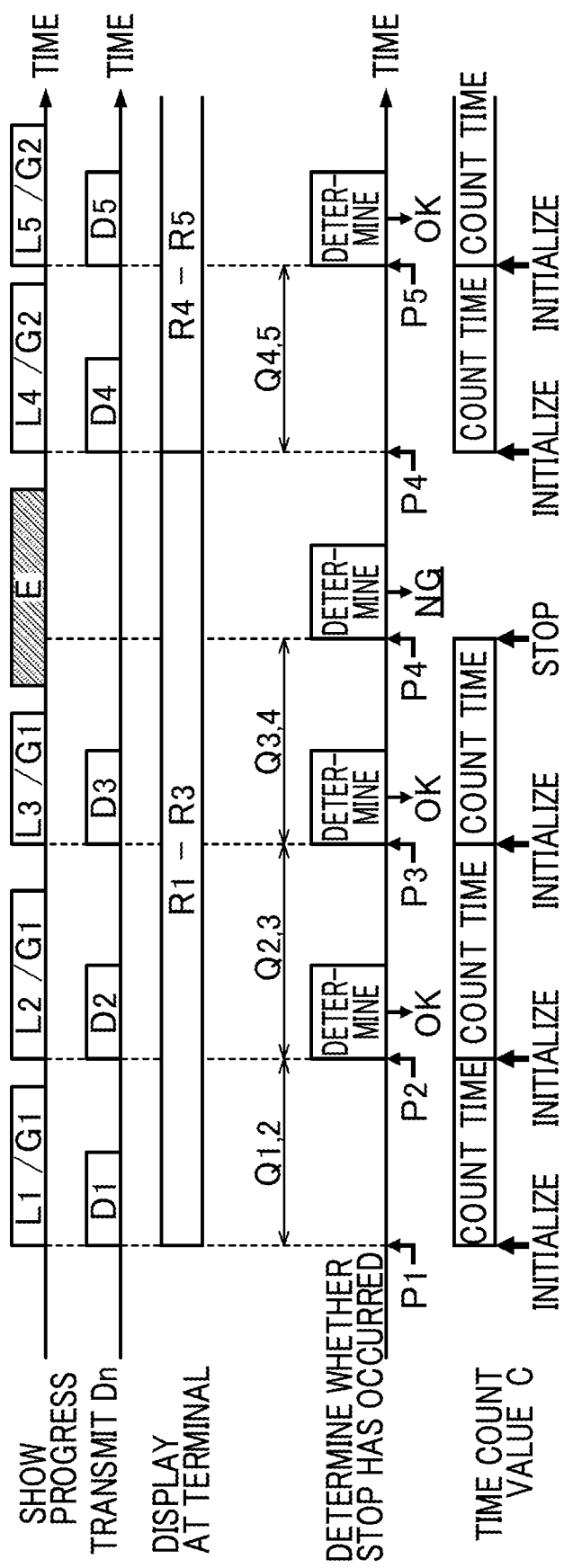
FIG. 8 is an explanatory diagram illustrating an operation of the terminal apparatus when an unexpected situation arises.

FIG. 8 is an explanatory diagram illustrating a case where, as a result of an unexpected situation E arising between two consecutive quote group $G_{m-1}$ and quote group $G_m$ (i.e., immediately before the earliest quote $L_n$ of the quote group $G_m$), the quote progress stops immediately before the earliest quote $L_n$ of the quote group $G_m$. Specifically, FIG. 8 shows a case where an unexpected situation E arises between the quote $L_3$ of the quote group $G_1$ and the earliest quote $L_4$ of the immediately subsequent quote group $G_2$, and as a result the quote $L_4$ is delayed.

The stop determiner 48 determines whether the information receiver 50 receives the identification information $D_4$ of the quote $L_4$ within a determination period W starting from the estimated time point $P_4$ that the time point identifier 44 has identified. As shown in FIG. 8, since an unexpected situation E has arisen at the estimated time point $P_4$, the identification information $D_4$ is not transmitted or received during the determination period W. Consequently, the stop determiner 48 determines that the quote progress has stopped ("NG" in FIG. 8). In this case, counting of the time count value C (estimated time point $P_5$ identification) by the time point identifier 44 and the display update by the playback controller 46 are deferred.

When the unexpected situation E ends, the distribution apparatus 10 resumes reproducing the audio signal X (identification information $D_n$ transmission). As shown in FIG. 8, if the information receiver 50 receives the identification information $D_4$ for the first time after the quote progress has resumed, a time point at which the identification information $D_4$ is received is treated as a new estimated time point $P_4$, and the time point identifier 44 resumes counting the time count value C, starting from an initialized value. The playback controller 46 causes related information $R_n$ of the quotes $L_n$ (related information $R_4$ and $R_5$) belonging to the quote group $G_2$ to be displayed on the display device 29. This display is triggered by receipt of the identification information $D_4$ by the information receiver 50. Thus, the display of related information $R_n$ of the quotes $L_n$ (related information $R_1$, $R_2$ and $R_3$) of the quote group $G_1$ is updated to the display of related information $R_n$ of the quotes $L_n$ (related information $R_4$ and $R_5$) of the quote group $G_2$ when two conditions are satisfied, the two conditions being a) when the time difference $Q_{3,4}$ is counted by the time point identifier 44 (arrival of the estimated time point $P_4$ before update); and b) when the identification information $D_4$ of the quote $L_4$ is received.

As will be understood from the foregoing description, when the stop determiner 48 determines that the quote progress has stopped, the playback controller 46 defers update of related information $R_n$ for display on the display device 29, whereas the playback controller 46 resumes update of displayed related information $R_n$ when the information receiver 50 receives the identification information $D_n$ after determination by the stop determiner 48. The above are examples of operations performed by the terminal apparatus 20 when an unexpected situation E arises.

Figure 9:
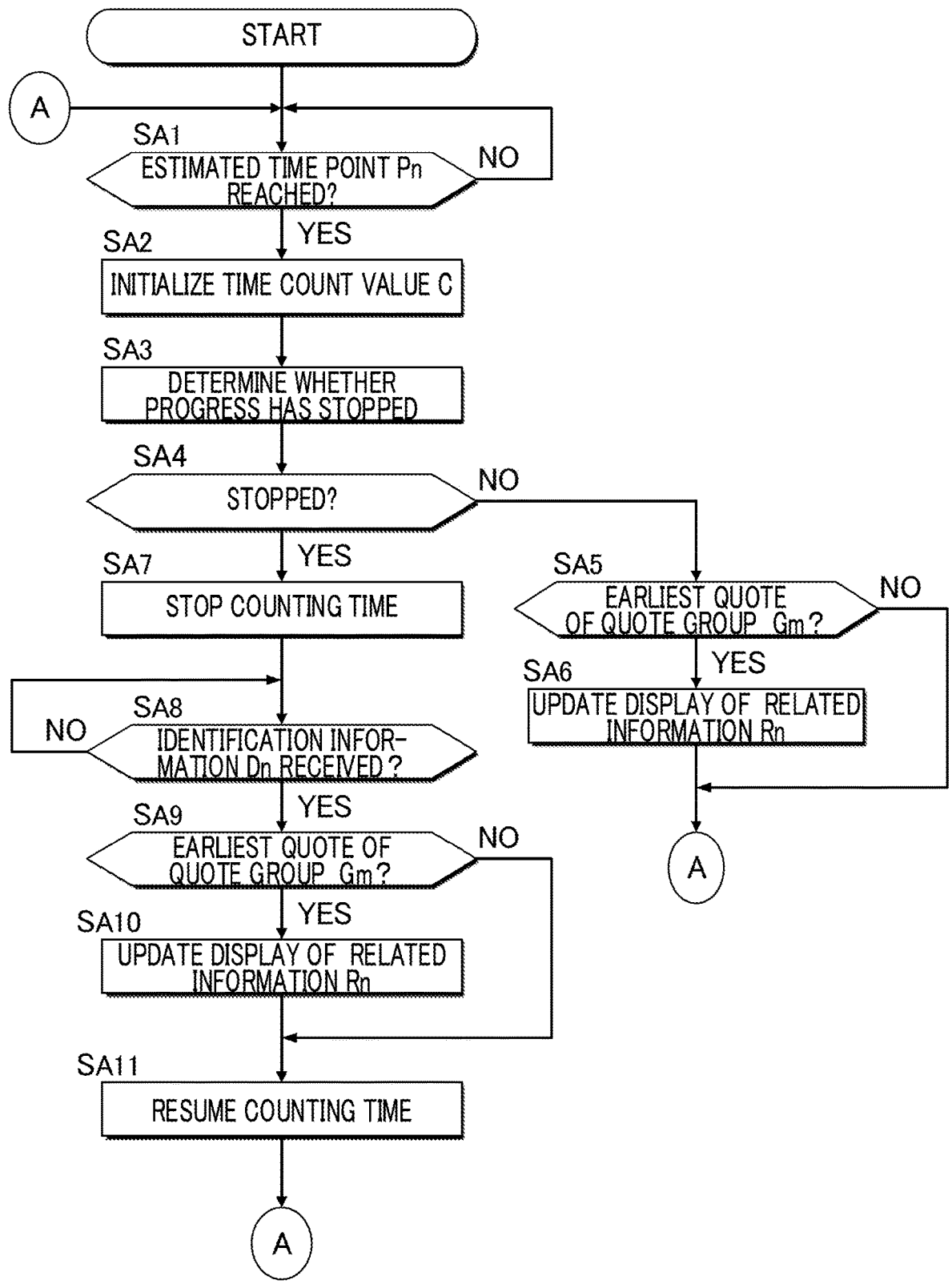
FIG. 9 is a flowchart illustrating an operation of the terminal apparatus.

FIG. 9 is a flowchart illustrating a process executed by the control device 21 of the terminal apparatus 20. When the process of FIG. 9 starts, the time point identifier 44 waits until an estimated time point $P_n$ is reached (SA1: NO). When the estimated time point $P_n$ is reached (SA1: YES), the time point identifier 44 initializes the time count value C to zero and starts counting the time thereafter (SA2). The stop determiner 48 determines whether the quote progress has stopped depending on whether the information receiver 50 receives identification information $D_n$ of a quote $L_n$ during a determination period W including an estimated time point $P_n$ (SA3). If the quote progress has not stopped (SA4: NO), the playback controller 46 determines whether an estimated time point $P_n$ identified by the time point identifier 44 corresponds to the earliest quote $L_n$ of the quote group $G_m$ (SA5). When the estimated time point $P_n$ of the earliest quote $L_n$ of the quote group $G_m$ (e.g., the estimated time point $P_4$ in FIG. 4) (SA5: YES) is reached, the playback controller 46 causes the related information $R_n$ of the quotes $L_n$ belonging to the quote group $G_m$ to be displayed on the display device 29 (SA6). On the other hand, if the estimated time point $P_n$ corresponds to a quote $L_n$ other than the earliest one of the quote group $G_m$ (SA5: NO), the playback controller 46 maintains the current display of the related information $R_n$. Thus, as will be understood also from FIG. 4, the display on the display device 29 is not updated even if a quote $L_n$ other than the earliest one of the quote group $G_m$ is played. After the above process is executed, the routine proceeds to a standby state and awaits arrival of the next estimated time point $P_n$ (SA1).

As described in the foregoing, in the first embodiment, in a case where the quote progress has not stopped, related information $R_n$ of a quote(s) $L_n$ of the quote group $G_m$ is displayed, the display being triggered by arrival of an estimated time point $P_n$ corresponding to the earliest quote $L_n$ of the quote group $G_m$. Thus, receipt of the identification information $D_n$ is not a condition for updating the display of the related information $R_n$. Accordingly, even in an environment in which identification information $D_n$ transmitted by the distribution apparatus 10 may not be properly received, it is possible to display related information $R_n$ of quotes $L_n$ in conjunction with the quote progress.

On the other hand, as illustrated in FIG. 7 and FIG. 8, in a case where the quote progress has stopped (SA4: YES), the time point identifier 44 stops counting time of the time count value C (SA7). The routine then proceeds to a state of waiting for the information receiver 50 to receive the identification information $D_n$ transmitted by the distribution apparatus 10 (SA8: NO). When the information receiver 50 receives identification information $D_n$ (SA8: YES), the playback controller 46 determines whether the identification information $D_n$ received by the information receiver 50 corresponds to the earliest quote $L_n$ of the quote group $G_m$ (SA9), by referring to the information table T, for example.

If the identification information $D_n$ corresponds to a quote $L_n$ other than the earliest one of the quote group $G_m$ (SA9: NO), i.e., if an unexpected situation E arises immediately before the quote $L_n$ other than the earliest one of the quote group G the display of related information $R_n$ by the playback controller 46 is not updated (SA10). In this case, as described with reference to FIG. 7, the time point identifier 44 treats a time point at which the identification information $D_n$ is received as a new estimated time point $P_n$ and resumes counting the time count value C (SA11).

If the identification information $D_n$ corresponds to the earliest quote $L_n$ of the quote group $G_m$ (SA9: YES), i.e., if an unexpected situation E arises immediately before the earliest quote $L_n$ of the quote group $G_m$, the playback controller 46, as described above with reference to FIG. 8, causes the related information $R_n$ of multiple quotes $L_n$ belonging to the quote group $G_m$ to be displayed on the display device 29 (SA10). The time point identifier 44 then treats a time point at which the identification information $D_n$ is received as a new estimated time point $P_n$, and resumes counting the time count value C (SA11).

As described in the foregoing, in the first embodiment, it is determined whether the quote progress has stopped depending on whether identification information $D_n$ is received at around an estimated time point $P_n$ at which each quote $L_n$ is expected to take place. If it is determined that the quote progress has stopped, the playback controller 46 defers updating displayed related information $R_n$. In this way, after the quote progress has resumed, it is possible to play related information $R_n$ of a quote $L_n$ in conjunction with the quote progress. Furthermore, in the first embodiment, a time point at which a time difference specified by the information table T has elapsed from an estimated time point $P_n$ of a quote $L_n$ is identified as an estimated time point $P_{n+1}$ of a quote $L_{n+1}$. Therefore, the first embodiment has an advantage in that an estimated time point $P_n$ of each quote $L_n$ can be identified with a simple configuration of counting up an elapsed time (time count value C) from each estimated time point $P_n$.

Second Embodiment

A second embodiment of the present invention is now described. In each of the configurations described below, elements having substantially the same actions or functions as those in the first embodiment will be denoted by the same reference symbols as those used in the description of the first embodiment, and detailed description thereof will be omitted as appropriate.

Figure 10:
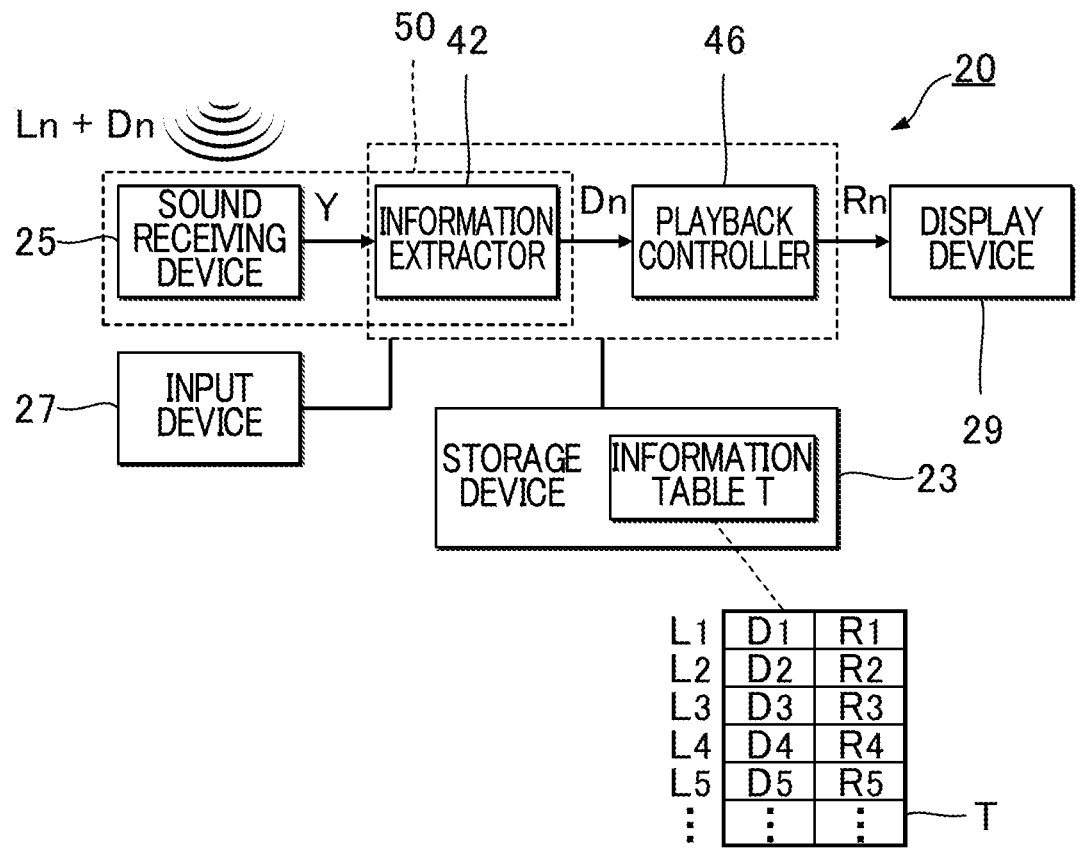
FIG. 10 is a block diagram of a terminal apparatus according to a second embodiment.

FIG. 10 is a block diagram of a terminal apparatus 20 according to the second embodiment. Similarly to that of the first embodiment, the distribution apparatus 10 sequentially transmits identification information $D_n$ of quotes $L_n$ via sound communication in conjunction with the quote progress in the show. As shown in FIG. 10, a control device 21 of the terminal apparatus 20 in the second embodiment functions both as an information extractor 42 and a playback controller 46. The information extractor 42, similarly to that of the first embodiment, extracts identification information $D_n$ from an audio signal Y generated by the sound receiving device 25. Accordingly, the sound receiving device 25 and the information extractor 42 of the terminal apparatus 20 in the second embodiment, similarly to the first embodiment, function as an information receiver 50 that can receive identification information $D_n$ of quotes $L_n$ sequentially transmitted from the distribution apparatus 10. In other words, identification information $D_n$ of quotes $L_n$ are sequentially extracted each time a quote $L_n$ is voiced by the sound output device 18.

Registered in the information table T stored in the storage device 23 of the second embodiment is a pair of identification information $D_n$ ($D_1, D_2, D_3, \ldots$) and related information $R_n$ ($R_1, R_2, R_3, \ldots$) for each of multiple quotes $L_n$ that may be played in the show. The playback controller 46 retrieves related information $R_n$, from the information table T, which corresponds to the identification information $D_n$ extracted by the information extractor 42, to cause the retrieved related information $R_n$ to be displayed on the display device 29. In other words, in the second embodiment, related information $R_n$ of quotes $L_n$ are sequentially displayed on the display device 29, triggered by receipt of the identification information $D_n$ of a corresponding quote $L_n$.

Figure 11:
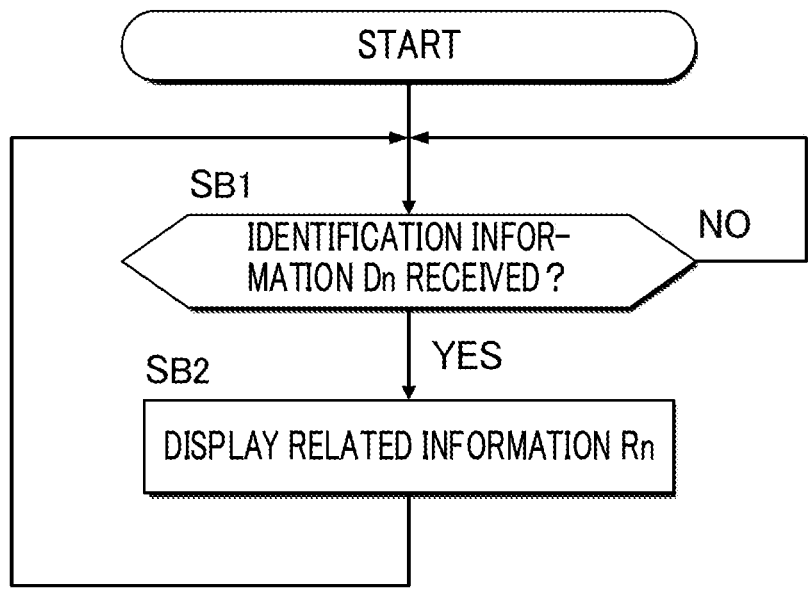
FIG. 11 is a flowchart illustrating an operation of the terminal apparatus according to the second embodiment.

FIG. 11 is a flowchart illustrating a process executed by the control device 21 of the terminal apparatus 20 according to the second embodiment. When the process of FIG. 11 starts, the playback controller 46 waits for the information receiver 50 to receive identification information $D_n$ (SB1: NO). If the information receiver 50 receives identification information $D_n$ (SB1: YES), the playback controller 46 retrieves from the information table T related information $R_n$ that corresponds to the identification information $D_n$ received by the information receiver 50, to cause the retrieved related information $R_n$ to be displayed on the display device 29 (SB2).

Figure 12:
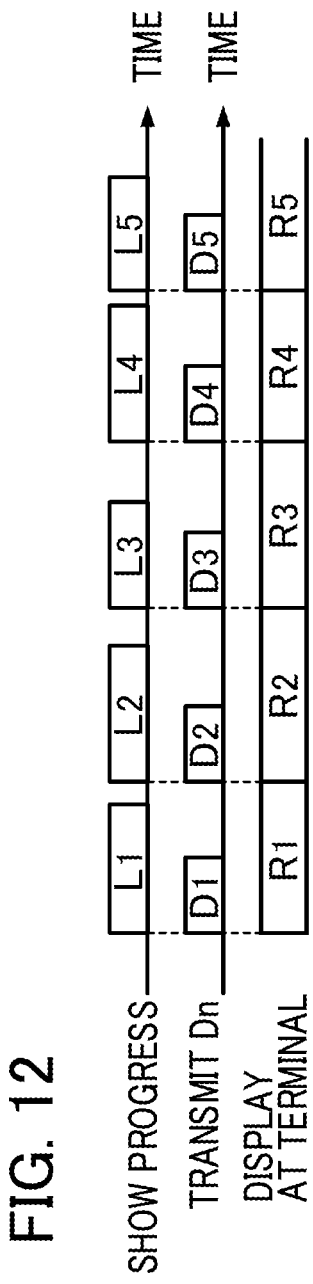
FIG. 12 is an explanatory diagram illustrating an operation of the terminal apparatus according to the second embodiment.
Figure 13:
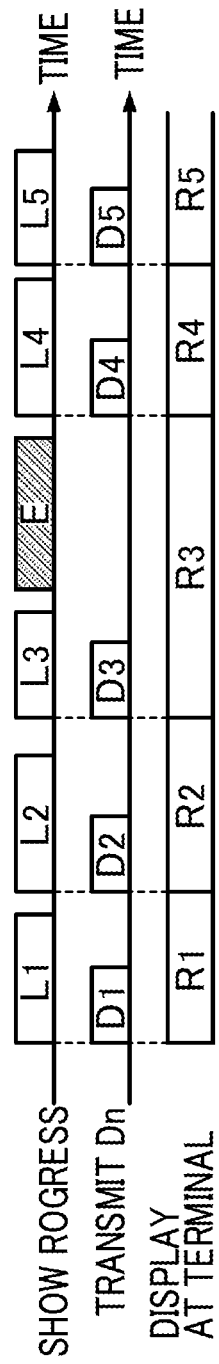
FIG. 13 is an explanatory diagram illustrating an operation of the terminal apparatus when an unexpected situation arises.

As a result of the above operation being executed, in the second embodiment, as shown in FIG. 12, related information $R_n$ of a quote $L_n$ is displayed, triggered by receipt of corresponding identification information $D_n$ of the quote $L_n$, where quotes $L_n$ are transmitted chronologically. On the other hand, in a case where the quote progress has stopped due to occurrence of an unexpected situation E, for example, the identification information $D_n$ transmission by the distribution apparatus 10 is deferred. Thus, as shown in FIG. 13, after the quote progress resumes, in the second embodiment also it is possible to play related information $R_n$ of the quote $L_n$ in conjunction with the quote progress.

Modifications

Various modifications may be made to the embodiments described above. Specific modifications will be described below. Two or more modifications may be freely selected from the following and combined as appropriate so long as they do not contradict one another.

(1) In each of the above embodiments, related information $R_n$ is displayed on the display device 29. However, a method of playing the related information $R_n$ is not limited thereto. For example, an audio signal representative of a sound of a spoken quote $L_n$ may be stored for each quote $L_n$ in the storage device 23 as related information $R_n$. A sound represented by thus stored related information $R_n$ that corresponds to identification information $D_n$ received by the information receiver 50 may be output as sound from a sound output device, such as speakers or headphones. It is of note that, in this case, the sound of a quote $L_n$ may be voice synthesized using the quote $L_n$. As will be understood from the foregoing description, the playback controller 46 is understandable as an element for causing a playback device to play related information $R_n$. The playback device includes the display device 29 that displays related information $R_n$ in the form of images and a sound output device that outputs a sound represented by related information $R_n$.

(2) In each of the above embodiments, as described with reference to FIG. 3, the identification information $D_n$ is transmitted from the beginning of the playback section of a corresponding quote $L_n$. However, a relation between the playback section of a quote $L_n$ and a time point at which the identification information $D_n$ is transmitted is not limited thereto. For example, transmission of identification information $D_n$ may start at a time point preceding the start of the playback section of a corresponding quote $L_n$. Using the above configuration, it is possible to determine whether the quote progress has stopped at a time point immediately before an estimated time point $P_n$.

Specifically, the stop determiner 48 determines whether the quote progress has stopped depending on whether the information receiver 50 receives identification information $D_n$ of a quote $L_n$ within a determination period W from a time point preceding an estimated time point $P_n$ of each quote $L_n$ up to a time point subsequent thereto. The determination period W is a period of a predetermined length having the estimated time point $P_n$ as a midpoint, for example. By the above configuration, in a case where identification information $D_n$ is transmitted before the start of the playback section of each quote $L_n$, it is possible to determine whether the quote progress has stopped before the arrival of an estimated time point $P_n$. On the other hand, in a configuration in which identification information $D_n$ is transmitted from the start of the playback section of a corresponding quote $L_n$, the stop determiner 48 determines whether the information receiver 50 receives the identification information $D_n$ within a determination period W starting from an estimated time point $P_n$ as described in each of the above embodiments.

(3) In each of the above embodiments, text representative of each quote $L_n$ is played (displayed) as related information $R_n$. However, the content of the related information $R_n$ is not limited thereto. For example, a translated text or audio of the translated text of each quote $L_n$ may be played as related information $R_n$, with the translated text being a rendering of an original text of each quote $L_n$ in one language into another language. Alternatively, a commentary text of a show or audio thereof may be played as related information $R_n$.

In each of the above embodiments, an example is given of a case where there are played related information $R_n$ of quotes $L_n$ that are chronologically played. However, a scene in which the information providing system 100 is used is not limited to a show as described in each of the above embodiments. For example, the information providing system 100 according to each of the above embodiments may be used in a scene in which guidance voice spoken sequentially for guidance on various facilities such as transportation facilities (e.g. trains or buses), exhibition facilities (e.g., historic, science, or art museums), or tourist facilities. As will be understood from the above examples, the information providing system 100 is expressed in general terms as a computer system for providing related information $R_n$ of each event transmitted in conjunction with a plurality of events (e.g., an event being outputting sound of quotes $L_n$ or that of guidance) that take place chronologically. Likewise, playback of quotes $L_n$ and guidance on various facilities are each understandable in general terms as events that occur chronologically, and the quote group $G_m$, which is described in each of the above embodiments, is an example of event groups into which multiple events are divided. A single event may include display of multiple pieces of information either simultaneously or sequentially (chronologically). An example thereof is display of multiple quotes $L_n$ corresponding to quotes that are expressed in different languages (e.g., Japanese and a foreign language).

(4) In each of the above embodiments, it is determined whether the quote progress has stopped depending on whether the information receiver 50 receives identification information $D_n$ at around an estimated time point $P_n$ of each quote $L_n$. However, transmission of identification information $D_n$ may be omitted for a quote(s) $L_n$ other than the earliest one of the quote group $G_m$. For example, the distribution apparatus 10 may transmit a control signal not containing identification information $D_n$ at a predetermined interval (e.g., at a freely-selected cycle that does not coincide a quote $L_n$), whereas the terminal apparatus 20 may sequentially identify estimated time points $P_n$ at the same interval. By the above configuration, the stop determiner 48 determines whether the quote progress has stopped depending on whether the information receiver 50 receives a control signal at around an estimated time point $P_n$.

(5) Each of the above embodiments is configured to reproduce an audio signal X containing an audio component of a quote $L_n$ and an audio component of identification information $D_n$. However, a configuration may be provided such that an audio signal X does not contain an audio component of each quote $L_n$. For example, an audio signal X may be generated by mixing, in real time and in conjunction with the progress of a show, an audio signal of a received voice of a performer of the show and an audio signal representative of an audio component of identification information $D_n$, and the thus generated audio signal X may be supplied to a sound output device. Further, in each of the above embodiments, a sound output device 18 that plays a quote $L_n$ is used for transmitting identification information $D_n$. However, identification information $D_n$ may be transmitted to a terminal apparatus 20 from a sound output device that is separate from a sound output device for playing quotes $L_n$.

(6) In each of the above embodiments, identification information $D_n$ is transmitted to a terminal apparatus 20 via sound communication utilizing sound waves as a transmission medium, but a communication method for transmitting the identification information $D_n$ to a terminal apparatus 20 is not limited to sound communication. For example, identification information $D_n$ may be transmitted to a terminal apparatus 20 in synchronization with sound output of a quote $L_n$ by the sound output device 18, via wireless communication utilizing electromagnetic waves, such as radio waves or infrared rays, as a transmission medium. As will be understood from the above examples, short-range wireless communication that does not involve a communication network, such as a mobile communication network, is suitable for transmission of identification information $D_n$. Sound communication utilizing sound waves as a transmission medium and wireless communication utilizing electromagnetic waves are each examples of short-range wireless communication.

(7) In each of the above embodiments, the playback controller 46 causes related information $R_n$ pre-stored in the storage device 23 of the terminal apparatus 20 to be selectively displayed on the display device 29. However, related information $R_n$ need not be acquired from the storage device 23. For example, a configuration can be assumed in which a multiplicity of related information $R_n$ are retained in a management server, and the terminal apparatus 20 communicates with the management server via a communication network. By the above configuration, the playback controller 46 transmits, to the management server, an information request specifying identification information $D_n$ extracted by the information extractor 42. The management server retrieves related information $R_n$ corresponding to the identification information $D_n$ specified by the information request, to transmit the retrieved related information $R_n$ to the requesting terminal apparatus 20. The playback controller 46 of the terminal apparatus 20 causes the related information $R_n$ received from the management server to be displayed on the display device 29.

(8) The terminal apparatus 20 illustrated in each of the above embodiments is realized by the control device 21 and a program working in coordination with each other. The program of the first embodiment is a program for causing a computer to function as: an information receiver 50 that can receive identification information $D_n$ of each of multiple quotes $L_n$ that are transmitted sequentially in conjunction with occurrence of the multiple quotes $L_n$; a time point identifier 44 that sequentially identifies estimated time points $P_n$ at each of which each of the multiple quotes $L_n$ is estimated to occur; a stop determiner 48 that determines whether the progress of the multiple quotes $L_n$ has stopped depending on whether the information receiver 50 receives identification information $D_n$ of each quote $L_n$ at around an estimated time point $P_n$ of each quote $L_n$; and a playback controller 46 that, for each of the multiple quote groups $G_m$ obtained by temporally dividing the multiple quotes $L_n$, when an estimated time point $P_n$ that corresponds to the earliest quote $L_n$ of each quote group $G_m$ is reached, causes related information $R_n$ of a quote(s) $L_n$ belonging to quote group $G_m$ to be displayed on the display device 29. When the stop determiner 48 determines that the progress of the multiple quotes $L_n$ has stopped, the playback controller 46 defers update in the related information $R_n$ it causes the display device 29 to display, and, when the information receiver 50 receives the identification information $D_n$ after the determination, the playback controller 46 resumes update in the displayed related information $R_n$.

The program of the second embodiment is a program for causing a computer to function as: an information receiver 50 that can receive identification information $D_n$ of each of multiple quotes $L_n$ that are transmitted sequentially in conjunction with occurrence of the multiple quotes $L_n$; and a playback controller 46 that causes the display device 29 to display related information $R_n$ of a quote $L_n$ that corresponds to the identification information $D_n$ received by the information receiver 50.

Each of the programs of the first and second embodiments may be provided in a form stored in a computer-readable recording medium, and be installed on a computer. For instance, the storage medium may be a non-transitory storage medium, a preferable example of which is an optical storage medium, such as a CD-ROM (optical disc), and may also be a freely-selected form of well-known storage media, such as a semiconductor storage medium and a magnetic storage medium. The "non-transitory storage medium" is inclusive of any computer-readable recording media with the exception of a transitory, propagating signal, and does not exclude volatile recording media.

(9) Following are examples of configurations derived from the above embodiments.

First Mode

An information processing method according to an aspect (First Mode) of the present invention includes: receiving identification information for a plurality of events transmitted sequentially in conjunction with occurrences of the plurality of events; sequentially identifying estimated time points at each of which each event is estimated to occur; determining whether progress of the plurality of events has stopped depending on whether identification information for each event is received at around a corresponding estimated time point for each event; and in each of a plurality of event groups obtained by temporally dividing the plurality of events, when an estimated time point is reached for an earliest event among at least one event belonging to each event group, causing a playback device to play related information for the at least one event belonging to each event group, and when the progress of the plurality of events is determined to have stopped, deferring update in the related information, which the playback device is being caused to play, and then resuming the update in the related information when the identification information is received after the determination.

In the above mode, it is determined whether progress of the plurality of events has stopped depending on whether identification information for each event is received at around a corresponding estimated time point for each event, and when the progress of the plurality of events is determined to have stopped, update in the related information played at the playback device is deferred. Accordingly, even when the progress of a plurality of events has stopped, after progress resumes, related information for each event can be played in conjunction with the plurality of events. In contrast, when progress of a plurality of events has not stopped, related information for each event in an event group is played, being triggered by arrival of an estimated time point of the earliest event within the event group. In other words, it is not necessary to receive identification information for updating corresponding related information. Accordingly, even in an environment in which identification information cannot be properly received, it is possible to play related information for each event together with the progress of a plurality of events.

Second Mode

In a preferred example (Second Mode) of the First Mode, identifying of the estimated time points includes identifying a time difference between a first event and a second event from among the plurality of events, and identifying, as an estimated time point of the second event, a time point at which the time difference has elapsed from an estimated time point of the first event. In the above mode, a time point at which a time difference between a first event and a second event has elapsed from an estimated time point of the first event is identified as an estimated time point of the second event. Thus, this mode has an advantage in that an estimated time point of each event can be identified by way of a simple configuration of counting an elapsed time from each estimated time point. An information table specifying a time difference between two consecutive events is used for example, for identifying a time difference between the first event and the second event.

Third Mode

In a preferred example (Third Mode) of the First Mode or the Second Mode, the identifying of the estimated time points includes, upon receiving identification information for any one of the plurality of events after the progress of the plurality of events has stopped, treating a time point at which the identification was received as the estimated time point and identifying one or more estimated time points that follow, and when an event that corresponds to the identification information is the earliest event within one of the plurality of event groups, causing the playback device to play related information for at least one event of the one of the plurality of event groups. The playing of the related information is triggered by reception of the identification information. In the above mode, when receiving identification information after the progress of a plurality of events is determined to have stopped, a time point at which the identification information was received is treated as an estimated time point, and subsequent estimated time points are identified. In this way, it is possible to resume update in related information when progress of a plurality of events resumes.

Fourth Mode

In a preferred example (Fourth Mode) of any one of the First Mode to the Third Mode, each of the plurality of events consists of playback of sound by a sound output device, and the receiving of the identification information includes receiving the identification information for each event via sound communication using the sound output device. In the above mode, a sound output device used for playing a sound (the playing of a sound corresponds to an event) is also used for communicating identification information for an event. Therefore, compared with a case of using a dedicated communication device for communicating identification information, identification information can be provided to a terminal apparatus by use of a simple configuration.

Fifth Mode

In a preferred example (Fifth Mode) of any one of the First Mode to the Fourth Mode, the determination includes determining whether the identification information for each event is received during a determination period starting from each estimated time point of each event. This mode is suitable for a case in which identification information is transmitted at the same time as that at which a corresponding event takes place.

Sixth Mode

In a preferred mode (Sixth Mode) of any one of the First Mode to the Fourth Mode, the determination includes determining whether the identification information for each event is received during a determination period from a time point preceding each estimated time point of each event up to a time point subsequent to each estimated time point. This mode is suitable for a case where identification information is transmitted before an event takes place.

Seventh Mode

A terminal apparatus according to another aspect (Seventh Mode) of the present invention has: an information receiver configured to receive identification information for each of a plurality of events that are transmitted sequentially in conjunction with occurrences of the plurality of events; a time point identifier configured to sequentially identify estimated time points at each of which each event is estimated to occur; a stop determiner configured to determine whether progress of the plurality of events has stopped depending on whether the information receiver receives identification information for each event at around a corresponding estimated time point for each event; a playback controller configured to cause, for each of a plurality of event groups obtained by temporally dividing the plurality of events, when an estimated time point is reached for an earliest event among at least one event belonging to each event group, a playback device to play related information for the at least one event belonging to each event group, and when the stop determiner determines that the progress of the plurality of events has stopped, defer update in the related information, which the playback device is being caused to play, and then resume the update in the played related information when the identification information is received by the information receiver after the determination.

In the above mode, it is determined whether progress of the plurality of events has stopped depending on whether identification information for each event is received at around a corresponding estimated time point for each event, and when the progress of the plurality of events is determined to have stopped, update in the related information played at the playback device is deferred. Accordingly, even when the progress of a plurality of events has stopped, after progress resume, related information for each event can be played in conjunction with the plurality of events. In contrast, when the progress of a plurality of events has not stopped, related information for each event in an event group is played, being triggered by arrival of an estimated time point of the earliest event within the event group. In other words, it is not necessary to receive identification information for updating corresponding related information. Accordingly, even in an environment in which identification information cannot be properly received, it is possible to play related information for each event in conjunction with the progress of a plurality of events.

Eighth Mode

A terminal apparatus according to still another aspect (Eighth Mode) of the present invention has: an information receiver configured to receive identification information for a plurality of events transmitted sequentially in conjunction with occurrences of the plurality of events; and a playback controller configured to cause a playback device to play related information for each event that corresponds to the identification information of each event received by the information receiver. In the above mode, related information is played, triggered by receipt of identification information for each event, where identification information is sequentially transmitted in conjunction with occurrences of a plurality of events. Therefore, even if the progress of a plurality of events stops, after progress resumes, related information for each event can be played in conjunction with the plurality of events.

DESCRIPTION OF REFERENCE SIGNS

100 . . . information providing system, 10 . . . distribution apparatus, 12,21 . . . control device, 14,23 . . . storage device, 16,27 . . . input device, 18 . . . sound output device, 20 . . . terminal apparatus, 25 . . . sound receiving device, 29 . . . display device, 42 . . . information extractor, 44 . . . time point identifier, 46 . . . playback controller, 48 . . . stop determiner, 50 . . . information receiver.

What is claimed is:

1. An information processing method comprising:
storing, in a table in a memory, identification information and related information corresponding to each of a plurality of events, and a plurality of time differences corresponding to each pair of consecutive events in the plurality of events, the plurality of events being temporally divided into a plurality of event groups each including at least one event;
receiving the identification information for each of the plurality of events, the identification information being transmitted sequentially in conjunction with occurrence of the plurality of events;
sequentially identifying time points each at which a respective event among the plurality of events is estimated to occur by identifying:
from the stored table, a time difference between a first event and a second event from among the plurality of events; and
the time point of the second event, at which the time difference has elapsed from the time point of the first event;
determining, for each event, that progress of the plurality of events has stopped in a case where identification information corresponding to the respective event is not received during a determination period associated with the corresponding identified time point of the respective event;

updating, of the plurality of event groups, the related information when the identified time point is reached for an earliest event among the at least one event belonging to the respective event group, by causing a playback device to play the related information associated with the at least one event belonging to the respective event group; and deferring the updating of the played related information, in a case where the progress of the plurality of events is determined to have stopped, and then resuming the updating of the played related information, when the identification information is received after the determining.

2. The information processing method according to claim 1, wherein:

the identifying of the time points, upon receiving identification information for any one of the plurality of events after the progress of the plurality of events has stopped, identifies the time point at which the identification was received, identifies at least one time point that follows, and the updating, when the event corresponding to the identification information is the earliest event within one of the plurality of event groups, causes the playback device to play related information for at least one event among the one of the plurality of event groups, the playing of the related information being triggered by reception of the identification information.

3. The information processing method according to claim 1, wherein:

each of the plurality of events consists of playback of sound by a sound output device, and the receiving of the identification information receives the identification information for each event via sound communication using the sound output device.

4. The information processing method according to claim 1, wherein the determining determines whether the identification information for each event is received during the determination period starting from each identified time point of each event.

5. The information processing method according to claim 1, wherein the determining determines whether the identification information for each event is received during the determination period from a time point preceding each identified time point of each event up to a time point subsequent to each identified time point.

6. A terminal apparatus comprising:
at least one memory storing instructions; and
at least one processor that implements the instructions to:

store, in a table in the at least one memory, identification information and related information corresponding to each of a plurality of events, and a plurality of time differences corresponding to each pair of consecutive events in the plurality of events, the plurality of events being temporally divided into a plurality of event groups each including at least one event;

receive the identification information of the plurality of events, the identification information being transmitted sequentially in conjunction with occurrence of the plurality of events;

sequentially identify time points each at which a respective event among the plurality of events is estimated to occur by identifying:

from the stored table, a time difference between a first event and a second event from among the plurality of events; and the time point of the second event, at which the time difference has elapsed from the time point of the first event;

determine, for each event, that progress of the plurality of events has stopped in a case where identification information corresponding to the respective event is not received during a predetermined period associated with the corresponding identified time point of the respective event;

update, of the plurality of event groups, the related information when the identified time point is reached for an earliest event the among at least one event belonging to the respective event group, by causing a playback device to play the related information associated with the at least one event belonging to the respective event group; and defer the update of the played related information, in a case where the progress of the plurality of events is determined to have stopped, and then resume the update of the played related information when the identification information is received after the determining.

* * * * *